(12) United States Patent
Yu et al.

(10) Patent No.: US 12,116,737 B2
(45) Date of Patent: Oct. 15, 2024

(54) UNPOWERED ANTI-FROST ANTI-HEAVE HEAT GATHERING DEVICE AND SUBGRADE THEREOF

(71) Applicant: Northwest Institute of Eco-Environment and Resources, Chinese Academy of Sciences, Gansu (CN)

(72) Inventors: Qihao Yu, Gansu (CN); Zhenyu Zhang, Gansu (CN); Fujun Niu, Gansu (CN)

(73) Assignee: NORTHWEST INSTITUTE OF ECO-ENVIRONMENT AND RESOURCES, CHINESE ACADEMY OF SCIENCES, Lanzhou Gansu (CN)

( * ) Notice: Subject to any disclaimer, the term of this patent is extended or adjusted under 35 U.S.C. 154(b) by 523 days.

(21) Appl. No.: 17/582,274

(22) Filed: Jan. 24, 2022

(65) Prior Publication Data
US 2022/0307202 A1     Sep. 29, 2022

(30) Foreign Application Priority Data
Mar. 25, 2021   (CN) .......................... 202110320414.2

(51) Int. Cl.
*E01C 3/06* (2006.01)
*E01C 11/26* (2006.01)
*F24S 20/61* (2018.01)

(52) U.S. Cl.
CPC ................ *E01C 3/06* (2013.01); *E01C 11/26* (2013.01); *F24S 20/61* (2018.05)

(58) Field of Classification Search
CPC ... E01C 3/06; F24S 20/61; F24S 10/30; F24S 90/00
See application file for complete search history.

(56) References Cited

U.S. PATENT DOCUMENTS 5,233,971 A * 8/1993 Hanley ................... F24S 90/00
126/633
2017/0102192 A1* 4/2017 Olsen .................... F28D 20/021
(Continued)

FOREIGN PATENT DOCUMENTS

CN      202405295 U     8/2012
CN      103234232 A     8/2013
(Continued)

*Primary Examiner* — David J Laux
(74) *Attorney, Agent, or Firm* — MUNCY, GEISSLER, OLDS & LOWE, P.C.

(57) ABSTRACT

The invention provides an unpowered anti-frost anti-heave heat gathering device and subgrade thereof, comprising a solar heat absorber, a circulating tube, a transducer, and a heat gathering tube, wherein the solar heat absorber and the transducer are connected by the circulating tube to form a circulation loop, through which a liquid state circulating working medium flows, the solar heat absorber is configured to absorb solar energy and transfer heat to the transducer through the liquid state circulating working medium, the heat gathering tube comprises a heat absorption section and a heat release section in communication, the heat absorption section is inserted into the transducer for absorbing heat from the transducer and transferring heat to the heat release section, and the heat release section is inserted into a subgrade for heating the subgrade.

15 Claims, 5 Drawing Sheets

(56) References Cited

U.S. PATENT DOCUMENTS

2017/0141724 A1* 5/2017 O'Donnell .............. F24T 10/15
2018/0351181 A1* 12/2018 Read ..................... F28D 20/003

FOREIGN PATENT DOCUMENTS

| | | | |
|---|---|---|---|
| CN | 104596122 | A | 5/2015 |
| CN | 104803011 | A | 7/2015 |
| CN | 109440559 | A | 3/2019 |
| CN | 109577126 | A | 4/2019 |
| CN | 110241672 | A | 9/2019 |
| CN | 210268325 | U | 4/2020 |

* cited by examiner

UNPOWERED ANTI-FROST ANTI-HEAVE HEAT GATHERING DEVICE AND SUBGRADE THEREOF

CROSS-REFERENCE TO RELATED APPLICATIONS

This non-provisional application claims priority under 35 U.S.C. § 119(a) on Patent Applications No. 202110320414.2 filed on Mar. 25, 2021, in P.R. China, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD

The present invention relates to the technical field of infrastructure construction in a seasonally frozen ground region, and particularly to an unpowered anti-frost anti-heave heat gathering device and subgrade thereof.

BACKGROUND

In China western seasonally frozen ground region, due to the influence of low temperature and negative temperature climate and environmental change in winter, at a certain depth of surface layer, the soil body is frozen in winter, while completely melted in warm and other seasons, which is referred to as seasonally frozen ground in geocryology. For example, in a region surrounding Qinghai Lake in the middle of Qinghai province of China, the average temperature in the coldest January is −20.6° C., and the maximum frost depth may reach 1.8 m, which belongs to a typical seasonally frozen ground region. Such regions are at places of coastal plains, alluvial plains, ice platforms, and the like, and have a shallow water table, and moisture content in subgrades around Qinghai-Tibet highway and Qinghai-Tibet railway is high. Since 9% expansion in volume occur after water is frozen, it causes frost and heave of the subgrades after freezing. Due to the freezing and melting cycles, lifting and sinking of pavement or track of the subgrade occurs, it brings an important influence on the stability of the subgrade, and constitutes an important threat to traffic safety, causing an occurrence of freeze-thaw hazard of the subgrade.

As for this problem, methods such as replacement of coarse particles, chemical grouting, and waterproof curtain in the common regions are difficult to satisfy actual engineering needs, due to limitations of engineering conditions such as normal driving of trains without interruption, and crack at processing parts and extreme difficulty in an overall enclosure at a lower part of the subgrade caused by strong action of soil freezing and thawing in seasonally frozen ground regions.

It is a feasible method by heating the subgrade and preventing freezing of the subgrade, but due to weak study in the existing technology, there is still no novel measure suitable for actual conditions of sites and satisfying actual needs.

Some existing measures heat the subgrade by using solar energy. For example, the Chinese patent application document No. 201811518147.4 discloses an internal circulating solar heating device and an anti-frost anti-heave method for a subgrade, wherein heating tubes shall be arranged vertically, so it is difficult to heat a bottom of the subgrade horizontally and integrally. The Chinese patent application document No. 201510040363.2 discloses a method for preventing and treating frost heave hazard to water-containing subgrade in a cold region and a bundled low-temperature heat pipe, wherein the method has a low working efficiency, large volume, and needs electric energy for heating, so it is difficult to satisfy unpowered working conditions in the wild.

SUMMARY

To solve the technical problem, the embodiment of the invention provides an unpowered anti-frost anti-heave heat gathering device and subgrade thereof, which can take advantage of solar unpowered heat transfer, and hold a positive temperature of the subgrade all year round through continuous heat gathering of the subgrade, thereby effectively avoiding engineering diseases such as frost heave and uneven fluctuation of the subgrade in seasonally frozen ground regions.

The embodiment of the invention can be implemented by:

In a first aspect, the embodiment of the invention provides an unpowered anti-frost anti-heave heat gathering device, comprising a solar heat absorber, a circulating tube, a transducer, and a heat gathering tube, wherein the solar heat absorber and the transducer are connected by the circulating tube to form a circulation loop, a liquid state circulating working medium flows in the circulation loop, the solar heat absorber is configured to absorb solar energy, and transfer heat to the transducer through the liquid state circulating working medium, the heat gathering tube comprises a heat absorption section and a heat release section in communication, the heat absorption section is inserted into the transducer for absorbing heat from the transducer and transferring heat to the heat release section, and the heat release section is inserted into a subgrade for heating the subgrade.

In such a way, the solar heat absorber absorbs solar power, and transfers heat to the transducer through the liquid state circulating working medium in the circulating tube, and the heat absorption section of the heat gathering tube absorbs heat from the transducer and transferring the heat to the heat release section, and the heat release section heats the subgrade, such that the subgrade is always in net heat absorption, and heat is continuously accumulated inside to realize heat gathering inside the subgrade and a state where the temperature is always held to be positive, thereby reaching objects of preventing and treating freezing of the subgrade, frost heave of the subgrade and engineering diseases.

In an optional embodiment, the heat gathering tube further comprises heat absorbing cores and phase change working mediums, wherein the heat absorbing cores are disposed on an inner wall of the heat gathering tube, and the phase change working mediums are filled in the heat gathering tube.

In such a way, the liquid state phase change working medium inside the heat absorption section is converted into a vapor state by absorbing heat from the transducer and moved to the heat release section under air pressure, and the vapor state phase change working medium in the heat release section is condensed into a liquid state and releases heat. Meanwhile, the liquid state phase change working medium continuously flows back to the heat absorption section under gravity and capillary force of the heat absorbing cores. Under such circulation, the heat gathering tube continuously transmits heat energy absorbed in the heat absorption section to the heat release section inside the subgrade efficiently to heat soil around the heat gathering tube.

In an optional embodiment, a plurality of the circulation loops are formed, the plurality of circulation loops are disposed on the heat absorption section at intervals, the heat gathering tube further comprises partition plates disposed on an inner wall of the heat absorption section at intervals, and inside the transducer, the partition plates are perpendicular to a length direction of the heat gathering tube for limiting at least a part of the liquid state phase change working mediums to flow along the length direction of the heat gathering tube, and keeping at least a part of the liquid state phase change working mediums inside the transducer.

In such a way, when the liquid state phase change working mediums inside the heat gathering tube flow to one end of the heat gathering tube, the partition plates can limit a part of the liquid state phase change working mediums inside the transducer, such that the transducer can heat more liquid state phase change working mediums once, thereby improving heat transfer efficiency of the transducer to the heat gathering tube.

In an optional embodiment, the heat gathering tube further comprises fins disposed on an outer wall of the heat absorption section, and inside the transducer.

In such a way, the fins can increase the contact area with the liquid state circulating working mediums in the transducer and improve the heat transfer efficiency of the liquid state circulating working mediums in the transducer to the heat absorption section of the heat gathering tube.

In an optional embodiment, the unpowered anti-frost anti-heave heat gathering device further comprises a pressure protection unit disposed on the circulating tube for controlling pressure in the circulating tube within a preset range.

In such a way, in summer, since solar radiation is strong, and the solar heat absorber continuously heats the liquid state circulating working mediums in the circulating tube to convert a part of working mediums into a vapor state, a pressure inside the device is dramatically increased, and the pressure protection unit can ensure the device not to suffer from adverse influence caused by overpressure.

In an optional embodiment, the pressure protection unit comprises a housing, a vapor-liquid conversion filter element, a positive pressure valve, a negative pressure valve, and cooling fins, wherein an opening at a lower end of the housing is in communication with the circulating tube, and an opening at an upper end of the housing is mounted with the positive pressure valve and the negative pressure valve, the vapor-liquid conversion filter element is disposed inside the housing, and the cooling fins are disposed on an outer wall of the housing.

In such a way, in the daytime of Summer, a part of the liquid state circulating working mediums in the circulating tube are converted to a vapor state and can flow through the vapor-liquid conversion filter element. During flowing, the vapor state working mediums are continuously cooled and converted into liquid state working mediums which flow back into the circulating tube. Alternatively, when the pressure inside the device exceeds a threshold value, the vapor state working mediums are directly exhausted via the positive pressure valve, thereby reducing the pressure of the device. At night, the vapor state working mediums in the circulating tube are largely condensed and liquified, so the pressure inside the device is obviously reduced, and when the negative pressure inside the device is too large, external air may enter into the device via the negative pressure valve, thereby improving the pressure of the device.

In a second aspect, the embodiment of the invention provides an unpowered anti-frost anti-heave heat gathering subgrade, comprising a subgrade and the unpowered anti-frost anti-heave heat gathering device according to any of the preceding embodiments, wherein the solar heat absorber is mounted outside the subgrade, and the heat release section of the heat gathering tube is inserted inside the subgrade.

In such a way, heat is gathering inside the subgrade, and the temperature of the subgrade is always held in a state of positive, thereby reaching objects of preventing and treating freezing of the subgrade, frost heave of the subgrade, and engineering diseases.

In an optional embodiment, an angle between a length direction of the heat gathering tube and a horizontal plane is within a range from −30° to 30°.

In such a way, it is convenient to mount the heat gathering tube in the subgrade, the drilling depth is small and the required number of the drilling depth is few, and the original engineering structure of the subgrade is not changed, thereby ensuring the stability of the original subgrade, having no influence on normal driving of trains during construction, and effectively solving difficulties in engineering construction when satisfying the condition of driving of the trains.

In an optional embodiment, the unpowered anti-frost anti-heave heat gathering subgrade further comprises a heat preservation material layer disposed on a slope of the subgrade.

In such a way, the heat preservation material layer can prevent heat loss inside the subgrade, and effectively ensure reservation of heat inside the subgrade during day-night change.

In an optional embodiment, two opposite sides of the subgrade are disposed with the unpowered anti-frost anti-heave heat gathering device, and one side of the subgrade is disposed with a plurality of unpowered anti-frost anti-heave heat gathering devices at intervals.

BRIEF DESCRIPTION OF THE DRAWINGS

To clearly explain the technical solution in the embodiment of the invention, hereinafter the desired accompanying drawings in the embodiment are simply introduced. It shall be understood that hereinafter the drawings only illustrate some examples of the invention, so it shall not be viewed as a definition to the scope. As for those ordinaries in the art, on the premise of making no creative work, other relevant drawings also can be obtained based on these drawings.

DETAILED DESCRIPTION

To make objects, technical solutions, and advantages of the embodiments of the invention clearer, hereinafter the technical solution in the embodiments of the invention is clearly and completely described with reference to the drawings in the embodiments of the invention. Obviously, the described embodiments are a part of the embodiments of the invention, not all embodiments. Generally, components in the embodiments of the invention described and illustrated in the drawings can be arranged and designed in various different configurations.

Therefore, detailed descriptions of the embodiments of the invention provided in the drawings do not aim to limit the scope protected by the invention, but only represent the selected embodiments of the invention. Based on the embodiments in the invention, on the premise of making no creative work, all other embodiments obtained by those ordinaries in the art belong to the scope protected by the invention.

It shall be noticed that similar reference signs and letters represent similar items in the drawings, so once one item is defined in one drawing, it is unnecessary to make further definition and explanation in subsequent drawings.

In the descriptions of the invention, it shall be noted that if orientation or positional relation indicated by terms "up", "down", "in" and "out" is the orientation or positional relation illustrated based on the drawings, or commonly placed orientation or positional relation when the invention products are used, it is only to facilitate describing the invention and simplifying the descriptions, not indicating or suggesting that the device or element must have a specific orientation, and is constructed and operated in a specific orientation, so the invention is not limited thereto.

It shall be noted that in the case of not conflicting, features in the embodiments of the invention can be combined.

Figure 1:
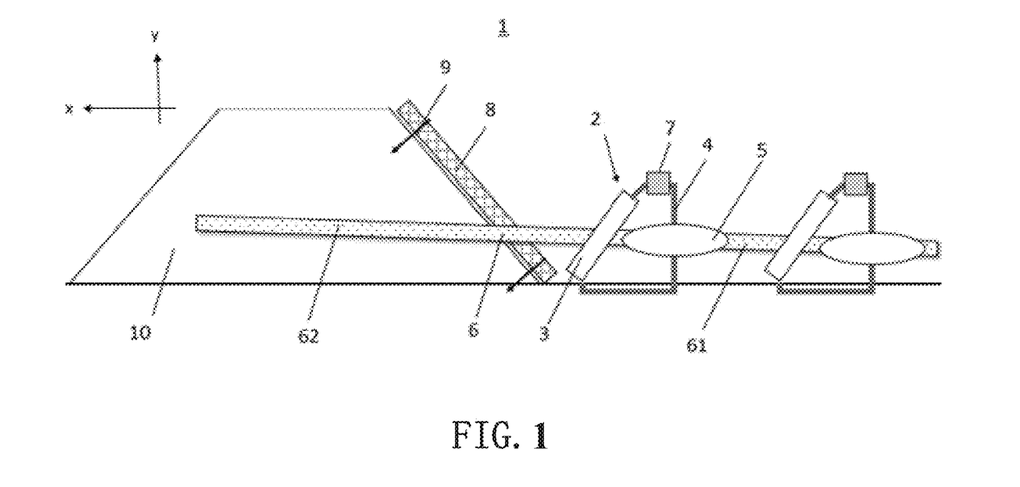
FIG. 1 is a structural view of an unpowered anti-frost anti-heave heat gathering subgrade provided in one embodiment of the invention.

Referring to FIG. 1, this embodiment provides an unpowered anti-frost anti-heave heat gathering subgrade 1, comprising a subgrade 10, an unpowered anti-frost anti-heave heat gathering device 2, and a heat preservation material layer 8.

Figure 2:
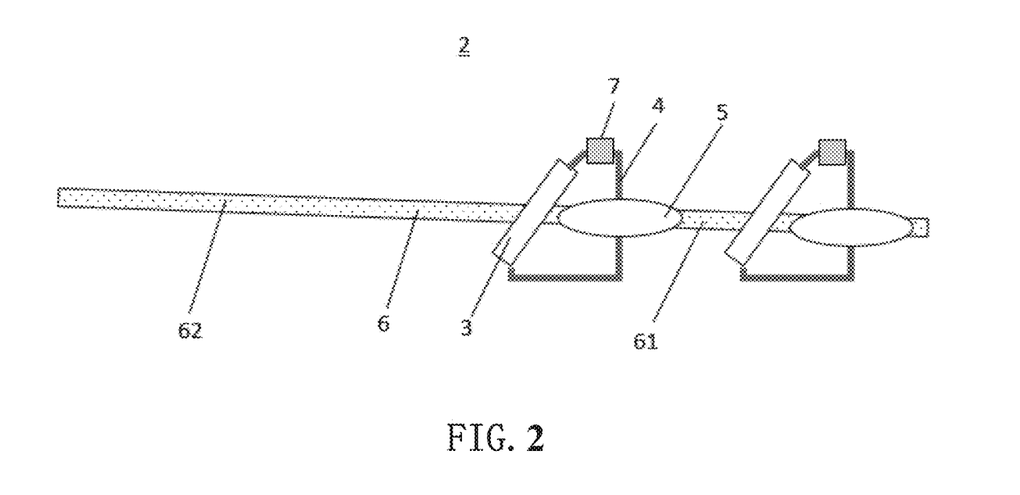
FIG. 2 is a structural view of an unpowered anti-frost anti-heave heat gathering device in FIG. 1.

Specifically, referring to FIGS. 1 and 2, the unpowered anti-frost anti-heave heat gathering device 2 comprises a solar heat absorber 3, a circulating tube 4, a pressure protection unit 7, a transducer 5, and a heat gathering tube 6. The solar heat absorber 3 can be disposed in a natural surface region close to a foot of a sunny slope side of the subgrade 10, and also can be disposed in a natural surface region where sun can irradiate in winter on a shady slope side of the subgrade 10.

The solar heat absorber 3 and the transducer 5 are connected by the circulating tube 4 to form a circulation loop, an upper end of the solar heat absorber 3 is an outlet end and is also an inlet of the circulating tube 4, and a lower end of the solar heat absorber 3 is an inlet end and is also an outlet of the circulating tube 4. A liquid state circulating working medium flows in the circulation loop, and the solar heat absorber 3 is configured to absorb solar energy, and transfer heat to the transducer 5 through the liquid state circulating working medium. The circulating tube 4 can use a metallic tube or a non-metallic tube resistant to solar radiation in the wild and aging. The liquid state circulating working medium uses non-freezing anti-frost fluid under the condition of −30° C. and has good flowability.

The solar heat absorber 3 can be formed by a single or multiple heat absorption units connected in parallel, only if the solar heat absorber 3 can have a suitable height, and an overall center of gravity is substantially overlapped with a center of gravity of the heat gathering tube 6. The solar heat absorber 3 is mainly arranged in parallel with each other with a suitable height, and a low, wide and large form, which improves stability in strong wind and wild harsh environment, and also better facilitates a circulation process of the entire device under unpowered condition since the heating units are at a relatively low position in the entire device.

In this embodiment, two circulation loops are provided, and the two circulation loops are disposed on the heat absorption section 61 at interval. In other words, two circulation loops disposed on the heat absorption section 61 at interval can improve the heating efficiency of the heat gathering tube 6 as compared to a single circulation loop. In other embodiments, more transducers 5 and circulation loops can be provided depending on the requirement for heating efficiency.

The heat gathering tube 6 belongs to the type of special heat tubes. The heat gathering tube 6 comprises a heat absorption section 61 and a heat release section 62 in communication, and the heat absorption section 61 is inserted into transducer 5, such that the transducer 5 fully encapsulates the heating section. The transducer 5 and the heat absorption section 61 form a sealed chamber, and the liquid state circulating working medium in the transducer 5 can flow through an outer wall of the heat absorption section 61.

The heat release section 62 is inserted into the subgrade 10 in a range between a half of the slope and a foot of the slope of the subgrade 10, and the insertion direction is perpendicular to a length direction of the subgrade 10. A length of the heat gathering tube 6 can be determined by the actual conditions of sites. The heat absorption section 61 is configured to absorb heat from the transducer 5 and transfer the heat to the heat release section 62, and the heat release section 62 is configured to heat the subgrade 10. An angle between a length direction of the heat gathering tube 6 and a horizontal plane is within a range from −30° to 30°. In this embodiment, preferably, the heat release section 62 of the heat gathering tube 6 curls upward by 5° to 10° relative to the heat absorption section 61. In other words, as shown in FIG. 1, an angle between the extension of the length of the heat gathering tube 6 along a direction x and upward elevation angle in a direction y is 5° to 10°, such that the length of the heat gathering tube 6 is across most width of the subgrade 10. A height of the heat gathering tube 6 is substantially at a middle lower position of the subgrade. In such a way, it is convenient to mount the heat gathering tube 6 in the subgrade, a drilling depth is small and the required number of the drilling depth is few, and the original engineering structure of the subgrade 10 is not changed, thereby ensuring the stability of the original subgrade 10, having no influence on normal driving of trains during construction, and effectively solving difficulties in engineering construction when satisfying the condition of driving of the trains. Moreover, due to the arrangement of liquid absorbing cores inside the heat gathering tube 6, since a height difference between the heat absorption section 61 and the heat release section 62, the effect of horizontal heat tubes is easily achieved under the action of gravity and capillary force, and efficient transfer of heat in a horizontal direction can be achieved, thereby realizing unpowered efficient heat transfer of the entire device.

The heat insulation material layer 8 is disposed on a slope of the subgrade 10, can cover the entire slope of the subgrade 10 and is fixed by an anchor rod 9. In other embodiments, the heat preservation material layer 8 is compacted and fixed by covering a thin layer of soil or other material on an outer surface of the heat preservation material layer 8. The heat preservation material layer 8 can select building rock wool heat insulation material or an integrated heat insulation plate. Specifically, both a sunny slope and a shady slope of the subgrade 10 can be provided with the heat insulation material layer 8, thereby preventing heat loss inside the subgrade 10, and effectively ensuring reservation of heat inside the subgrade 10 during day-night change.

Figure 3:
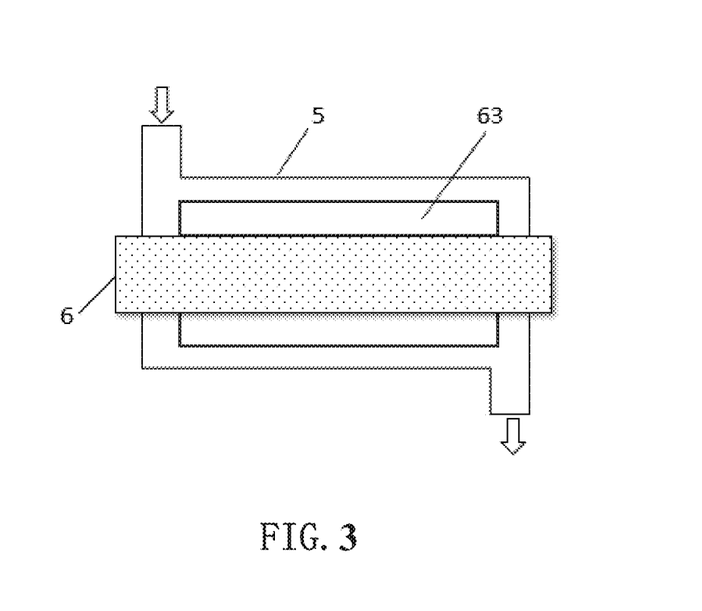
FIG. 3 is a sectional view of a transducer and a heat gathering tube in FIG. 2.
Figure 4:
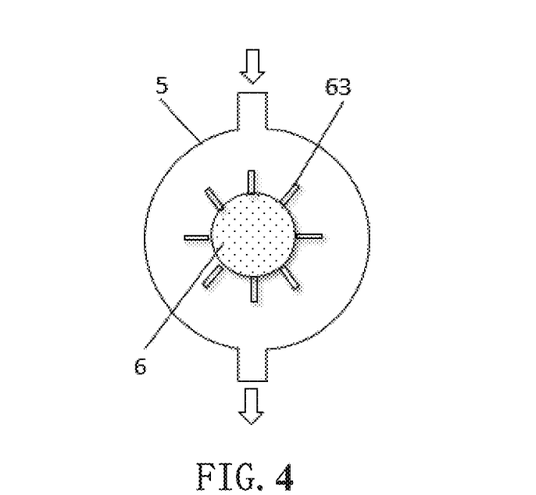
FIG. 4 is a left view of the structure in FIG. 3.

Referring to FIGS. 3 and 4, to increase heat absorption efficiency of the heat gathering tube 6, the heat gathering tube 6 further comprises fins 63 disposed on an outer wall of the heat absorption section 61, and inside the transducer 5, and the fins 63 extend in a length direction of the heat absorption section 61. The fins 63 can increase contact area with the liquid state circulating working mediums in the transducer 5, and improve heat transfer efficiency of the liquid state circulating working mediums in the transducer 5 to the heat absorption section 61 of the heat gathering tube 6.

Figure 5:
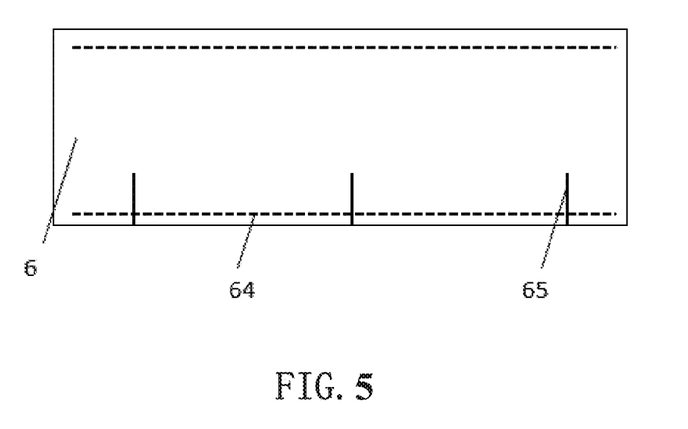
FIG. 5 is a sectional view of a heat gathering tube in FIG. 2.
Figure 6:
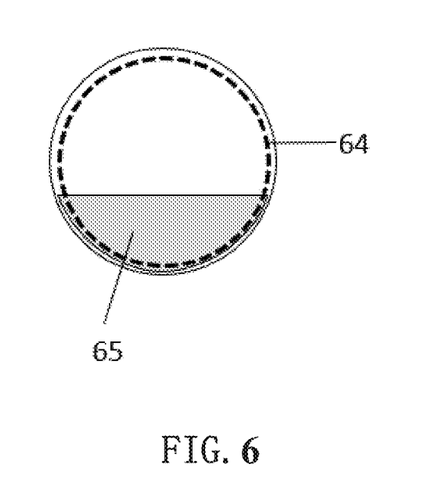
FIG. 6 is a left view of the structure in FIG. 5.

Referring to FIGS. 5 and 6, the heat gathering tube 6 further comprises heat absorbing cores 64, partition plates 65, and phase change working mediums 66. Specifically, the heat absorbing cores 64 are disposed on an inner wall of the heat gathering tube 6, the phase change working mediums 66 are filled in the heat gathering tube 6, such that the working mediums are fully absorbed on the inner wall of the heat gathering tube 6 under the action of capillarity force of the heat absorbing cores 64. During working, the working mediums on all inner wall surfaces of the heat gathering tube 6 are vaporized. As compared to tubes having no liquid absorbing cores, an evaporation area of the working mediums is multiplied, such that the evaporation and the amount of vapor state working mediums are multiplied, and the working efficiency of the whole heat gathering tube 6 is multiplied.

Figure 7:
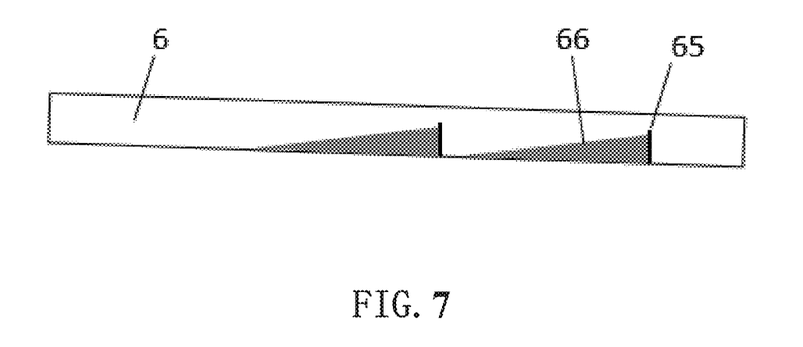
FIG. 7 is a schematic view showing a working state of a heat gathering tube and a transducer.

Referring to FIGS. 6 and 7, the partition plates 65 are disposed on an inner wall of the heat absorption section 61 at intervals, and inside the transducer 5. The partition plates 65 are perpendicular to a length direction of the heat gathering tube 6. Since the heat release section 62 of the heat gathering tube 6 is higher than the heat absorption section 61, when the liquid state phase change working mediums 66 inside the heat gathering tube 6 flow to one end of the heat absorption section 61, the partition plates 65 are configured to cut off a part of the liquid state phase change working mediums 66, and interval setting of the partition plates 65 allows the phase change working mediums 66 being uniformly distributed at corresponding positions of the heat absorption section 61 of the heat gathering tube 6 and the transducer 5, and the transducer 5 can heat more liquid state phase change working mediums 66 once, thereby improving heat transfer efficiency of the transducer 5 to the heat gathering tube 6.

Figure 8:
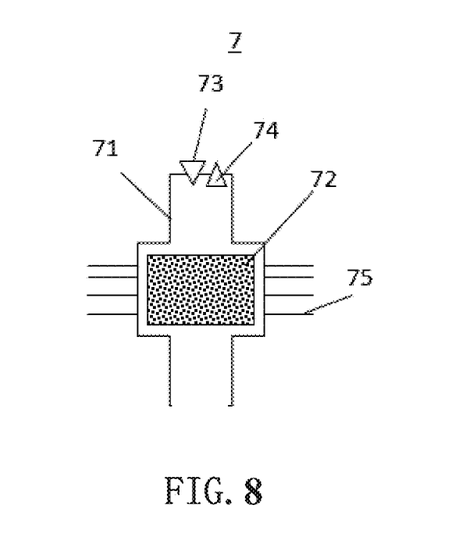
FIG. 8 is a sectional view of a pressure protection unit in FIG. 2.

Referring to FIG. 8, to prevent a large air pressure generated due to evaporation of the working mediums at a high temperature in the solar heat absorber 3 and the transducer 5 from affecting the circulation of the working mediums in the circulating tube 4, a pressure protection unit 7 is mounted on the circulating tube 4 for controlling a pressure in the circulating tube 4 within a preset range. Specifically, pressure protection unit 7 comprises a housing 71, a vapor-liquid conversion filter element 72, a positive pressure valve 73, a negative pressure valve 74, and cooling fins 75. The housing 71 and the cooling fins 75 are made of metal, an opening at a lower end of housing 71 is in communication with the circulating tube 4, and an opening at an upper end of housing 71 is mounted with the positive pressure valve 73 and the negative pressure valve 74, the vapor-liquid conversion filter element 72 is disposed inside the housing 71, and the cooling fins 75 are disposed on an outer wall of the housing 71. In such a way, in the daytime of summer, a part of the liquid state circulating working mediums in the circulating tube 4 is converted to a vapor state and can flow through the vapor-liquid conversion filter element 72, and during flowing, the vapor state working mediums are continuously cooled and converted into liquid state working mediums which flow back into the circulating tube 4. Alternatively, when the pressure inside the device exceeds a threshold value, the vapor state working mediums are directly exhausted via the positive pressure valve 73, thereby reducing the pressure of the device. At night, the vapor state working mediums in the circulating tube 4 are largely condensed and liquified, so the pressure inside the device is obviously reduced, and when the negative pressure inside the device is too large, external air may enter into the device via the negative pressure valve 74, thereby improving the pressure of the device, and ensuring that the whole system is not suffered from adverse influence caused by overpressure.

Working principles of the unpowered anti-frost anti-heave heat gathering device and subgrade thereof provided in this embodiment are as follows.

(a) At daylight sunshine conditions, the solar heat absorber 3 absorbs solar radiation energy, and heat the liquid state circulating working mediums inside, and as the temperature rises, the volume of heated liquid state circulating working mediums is expanded volume and the density is reduced, and thus a gravity difference of the working mediums inside the transducer 5 is produced. Under such a gravity difference, the working mediums having a high temperature release heat when flowing through the transducer 5, so the temperature is reduced, and the gravity difference is maintained. In such way, circulation is continuously performed, and under the condition without external power, heat is automatically converted from the solar heat absorber 3 to the heat absorption section 61 of the heat gathering tube 6 replying on its own convective heat transfer process;

(b) As the heat absorption section 61 is continuously heated, the liquid state phase change working mediums 66 inside the heat absorption section 61 is continuously converted into vapor state working mediums, heat is absorbed through phase change, and the vapor state working mediums are moved to the heat release section 62 under air pressure. In the heat release section 62, the vapor state working mediums are condensed and converted into liquid state working mediums, and heat is released through phase change. Meanwhile, the liquid state working mediums continuously flow back to the heat absorption section 61 under gravity and capillary force of the vapor-liquid conversion filter element 64. In such circulation, heat energy of the heat absorption section 61 is continuously transferred to the heat release section 62 inside the subgrade 10 to heat soil around the heat gathering tube 6;

(c) In a low temperature environment at night or cloudy days without solar radiation, the heat insulation material layer 8 on an outer side of the subgrade 10 can effectively prevent large loss of heat inside the subgrade 10.

In the above process of day and night circulation and heat transfer, the subgrade 10 is always in a state of net heat absorption and continuous accumulation of internal heat, thereby achieving heat gathering inside the subgrade 10 and the temperature of subgrade is always maintained at positive, and reaching objects of preventing and treating freezing of the subgrade 10, frost heave of the subgrade 10 and engineering diseases.

Figure 9:
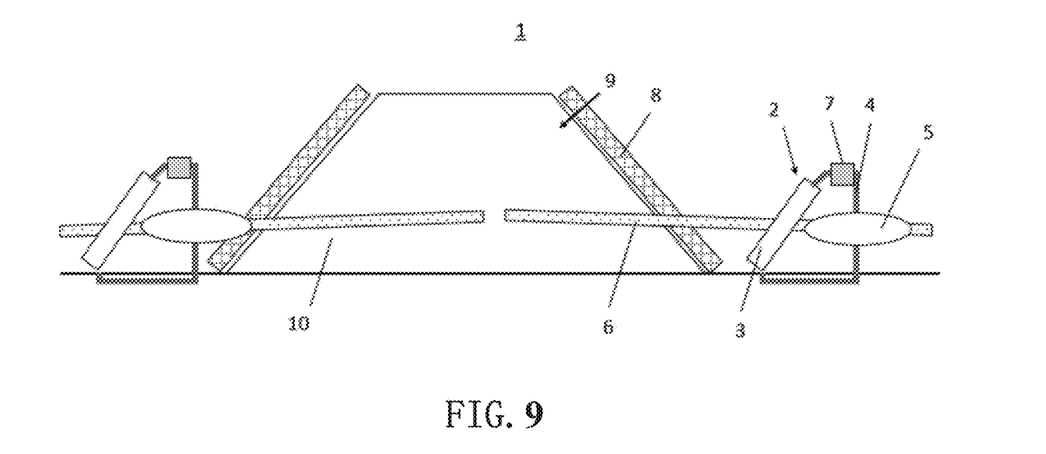
FIG. 9 is a structural view of another unpowered anti-frost anti-heave heat gathering subgrade provided in one embodiment of the invention.

It shall be noted that according to actual conditions of sites, the heat gathering tube 6 can only be disposed at one side of a sunny slope or one side of a shady slope of the subgrade 10 and can be disposed at both sides of the subgrade 10. In addition to disposing the unpowered anti-frost anti-heave heat gathering device 2 according to this embodiment at one side of the subgrade 10, referring to FIG. 9, as for a wider subgrade 10, for example, a wide subgrade 10 with two-way or multiple tracks of the railway, since heat release and a freezing strength of the subgrade 10 are huge, and engineering disease of frost heave at a lower part and a center of the subgrade 10 is more serious, the unpowered anti-frost anti-heave heat gathering device 2 can be disposed at two opposite sides of the subgrade 10. Moreover, as for the subgrade to be heated for a long distance, a plurality of unpowered anti-frost anti-heave heat gathering devices 2 also can be provided at one side of the subgrade 10 at intervals, and an interval of the two adjacent heat gathering tubes 6 can be 1 m to 5 m, thereby realizing objects of balanced and smooth anti-frost anti-heave on the wide subgrade 10.

Figure 10:
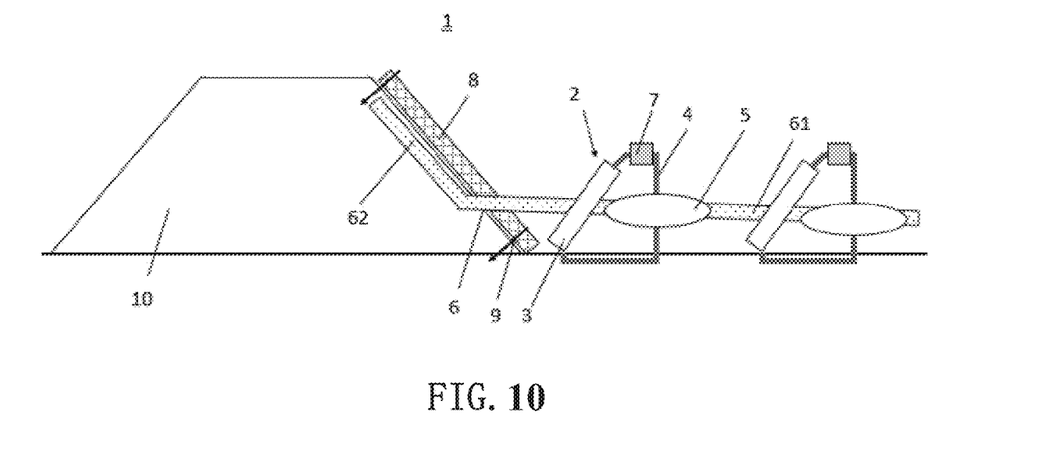
FIG. 10 is a structural view of another unpowered anti-frost anti-heave heat gathering subgrade provided in one embodiment of the invention.

In addition to a linear type, the heat gathering tube 6 provided in this embodiment, referring to FIG. 10, also can use a broken line shape. In other words, the heat absorption section 61 and the heat release section 62 of the heat gathering tube 6 are at a certain angle, such that the heat absorption section 61 can be held to be substantially horizontal, thereby facilitating the heat absorption section 61 to be arranged and connected to the transducer 5, and the heat release section 62 also can extend to a region to be heated most in the subgrade 10. For example, the heat release section 62 can be laid along a slope of the subgrade, and heat the subgrade 10 through heat transfer.

In actual application, the heat gathering tube 6, the heat insulation material layer 8, and the solar heat absorber 3 can be flexibly set and combined, for example, adjusting an embedded angle and an interval of the heat gathering tube 6, disposing the heat insulation material layer 8 at one side or both sides, even adding one auxiliary heat preservation layer, and the like, according to engineering conditions such as direction and height of the subgrade 10, and actual situations such as solar radiation and environmental conditions around the sites, thereby adjusting a temperature rising strength and an active region of a ground temperature field of the subgrade 10, and achieving an optimal ground temperature-regulating effect.

The unpowered anti-frost anti-heave heat gathering device and subgrade thereof provided in this embodiment can be mainly applied to seasonal frozen soil regions such as western China, take full advantage of rich solar energy resources in those regions, and realize balanced ground temperature regulation of the subgrade 10 through smooth heating of the ground temperature field of the subgrade 10 and key regulation of parts prone to frost heave in the subgrade 10, and hold a positive temperature of the subgrade 10 all year round, thereby effectively avoiding engineering diseases such as frost heave and uneven fluctuation of the subgrade 10 in the seasonally frozen ground region.

As compared to the existing engineering technology, the unpowered anti-frost anti-heave heat gathering device and subgrade thereof provided in this embodiment at least have the following advantages:

1. As compared to the existing grouting engineering technology, in the unpowered anti-frost anti-heave heat gathering device and subgrade thereof provided in this embodiment, firstly, the heat gathering tube 6 extends inside the subgrade 10 at the lower part of the subgrade 10 in a substantially horizontal direction, mainly covers most of regions at a bottom of the subgrade 10, and as compared to drilling holes vertically downward in the existing grouting engineering, the number of drilling holes and a depth of the drilling holes can be reduced; secondly, the existing grouting engineering changes engineering structure of the subgrade, while this embodiment is mainly to regulate a ground temperature for changing thermal properties of the subgrade 10, and mainly functions on regions with rich water and an expanded volume after frost heave in the subgrade 10, while not changing the original engineering structure of the subgrade 10; finally, the existing grouting engineering does not use the heat insulation material layer 8, while in this embodiment, the heat insulation material layer 8 can prevent heat loss inside the subgrade 10, and effectively ensure reservation of heat inside the subgrade 10 during day-night change;

2. As compared to the existing electric heating engineering technology, the existing electric heating engineering heats the subgrade through electric heating measures inside the subgrade, needs supply of external power, and requires building and laying of special electric power lines, so large electric power resources are consumed every year, and when internal electronic electric heating system has fault under wild use conditions, cost of operation and maintenance is large. However, the unpowered anti-frost anti-heave heat gathering device and subgrade thereof provided in this embodiment do not need an external power source, and circulate automatically, and realize the object of heating the subgrade 10 by taking full advantage of local rich solar energy resources, so they save energy sources, and are green and environmental protective.

To sum up, as compared to the existing engineering technology, the unpowered anti-frost anti-heave heat gathering device and subgrade thereof provided in this embodiment have notable progress and control freeze-thaw key elements in diseases of the subgrade 10 in the seasonally frozen ground region, thereby obtaining a multiplier effect with half the effort. The unpowered anti-frost anti-heave heat gathering device and subgrade thereof provided in this embodiment also realizes horizontal, balanced, and symmetrical distribution of ground temperature isolines of the subgrade 10, eliminating influence on a difference of thermodynamic coupling of the subgrade 10, and further enhancing the stability of a mechanical field of the subgrade 10. These effectively avoid engineering diseases such as uneven frost heave and longitudinal crack of the subgrade 10, in particular, the wide subgrade 10, and ensure long-term stability of the subgrade 10, so the embodiment of the invention has outstanding scientificity and advancement.

In an aspect of construction, this embodiment solves difficulties in existing engineering construction. Construction position in this embodiment is at one side or both sides of the subgrade 10, and construction method is drilling holes horizontally. Point construction is carried out on the subgrade 10, a speed of filling and drilling in the subgrade 10 is fast, and a diameter of the holes is small, so the stability of the subgrade 10 is not affected. Moreover, during construction, it is only to drill holes and insert into holes, while having no measures such as grouting and replacement, so it won't produce disturbance in a large range and change of mechanical properties to the subgrade 10, thereby further ensuring the stability of the original subgrade 10. The construction process does not constitute influence on normal driving of the trains and reaches the requirements for engineering construction under the condition of driving of the trains.

In an aspect of stability, in this embodiment, the solar heat absorber 3 is arranged in series with a suitable height, and a low, wide, and large form, which increases the stability of the whole device in the environment with strong wind. Moreover, lowering of a center of gravity of the heating units helps the formation and increase of a pushing force in the entire thermal circulation of the device, and ensures smooth and efficient working during the whole circulation and heat transfer.

To verify regulation efficiency of the unpowered anti-frost anti-heave heat gathering device and subgrade thereof provided in the embodiments of the invention, numerical modeling, and simulation calculation under the action of engineering measures are performed combined with geological conditions of the test engineering sites of Qinghai-Tibet Railway from Xining to Golmud in China.

Example: at one side of a shady slope of the subgrade for Qinghai-Tibet Railway with a height of 2.0 m and a top width of 7.5 m, the heat gathering tubes 6 are substantially horizontally inserted inside the subgrade at a height of 0.5 m, the heat release section 62 has a length of 8 m, and an interval of the heat gathering tubes 6 along a length direction of the subgrade is 2 m. In the heating system, heating power is 900 W with reference to the heating power of the existing 1 m$^2$ solar water heater in such region, working time is from 10 am to 4 pm in the daytime, and a heat transfer power is discounted and calculated by 50%. To further verify the effectiveness of such measures in adverse conditions, the heat preservation material layer 8 is not laid on the slope of the subgrade in simulation calculation.

Figure 11:
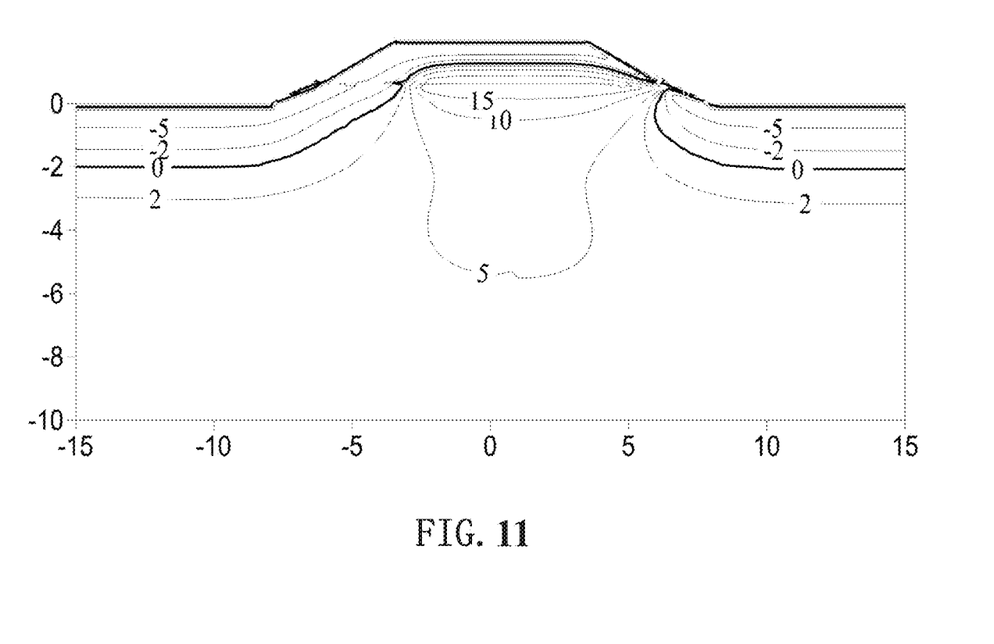
FIG. 11 is a schematic view of a ground temperature field of numerical simulation results after the subgrade is laid with heat gathering tubes for thirty days.

Under such working conditions, the heat gathering tubes 6 were set on December 15, and on January 15 of this Winter, a ground temperature field of simulation calculating results after the heat gathering tubes 6 were laid for 30 days was shown in FIG. 11. Specifically, FIG. 11 is a ground temperature profile of the subgrade at 8:30 am on the 30$^{th}$ day with a condition of the lowest external environmental temperature, in which the subgrade performs heat dissipation for one night. As can be seen, (a) in aspect of features of ground temperature values, the ground temperatures in most regions of the subgrade are positive, and the ground temperatures at positions of a supporting layer and having higher moisture of the lower part of the subgrade are in a relatively high temperature region, wherein the maximum temperature may reach 18° C.; (b) in aspect of characteristics of morphology of the ground temperature field, the ground temperature isolines represent horizontal and parallel morphological characteristics as a whole. In particular, the 0° C. isothermal line is distributed flat, i.e., the frozen zone and the positive temperature zone are in parallel to each other. The frozen zone is only distributed at an upper part of the subgrade with a thin layer, and the distribution is even and symmetrical, so engineering difficulties of the frozen soil can be effectively solved, and details are as follows.

(1) It improves the temperature state of the temperature field in a center region of the original subgrade, and satisfies the requirements for regulation of the temperature field of the railway subgrade in the seasonally frozen ground region. From FIG. 11, after implementation of this embodiment, the ground temperatures in the center region and the main supporting layer of the subgrade are positive, and positive temperature and high temperature soil cores are formed in the center of the subgrade. Moreover, since this part of soil body is characterized by a high moisture content, a large thermal capacity, and more gathered heat, the capability of anti-frost anti-heave of the subgrade is improved when the external environmental temperature is reduced.

(2) Distribution of 0° C. ground temperature isoline and other isothermal lines in the temperature field is completely horizontal and flat, and distribution of thin lines in the frozen zone is at a top of the subgrade and close to a revetment, which largely improves the stability of the subgrade. From FIG. 11, the temperature field of the subgrade is distributed flat, in particular, 0° C. isothermal line, and is convex upwardly as a whole in the subgrade, thereby facilitating discharging of water in the subgrade and significantly reducing frost heave amount of the subgrade at a stage where atmospheric precipitation and freeze-thawing are frequently alternated in early spring;

(3) It eliminates the influence of shady-sunny slope effect, and substantially eliminates engineering disease of the longitudinal crack in the subgrade. From FIG. 11, the temperature field of the subgrade beneath the pavement is substantially distributed symmetrically around a center of the subgrade, and the isothermal lines in the temperature field of the subgrade are distributed flat, as well as distribution of the frozen zone only at a top of the subgrade and a thin strip region under the revetment, which further weakens less transverse differential frost heave amount produced at a part of frozen positions, and further eliminates the possibility of the longitudinal crack of the subgrade.

This embodiment is only for representative analyses for the invention, and the conclusion substantially represents the effects to be achieved by the invention in tendency (different in specific values).

In addition, simulation calculation shows that when the railway is built in the seasonally frozen ground region according to the structure provided in this embodiment, the subgrade always stores heat energy during operation, and the frozen zone in the subgrade is reduced along with operating time, so the structure can satisfy the desired requirements for mechanical stability of the subgrade, and may sustain the long-term stability of the subgrade.

The above disclosures are only detailed embodiments of the invention, but the protection scope of the invention is not limited thereto. Easily conceivable change or substitution for any skilled in the art within the technical range disclosed by the invention shall be covered within the protection scope of the invention. Therefore, the protection scope of the invention shall be subjected to the scope protected by the appended claims.

What is claimed is:

1. An unpowered anti-frost anti-heave heat gathering device, comprising a solar heat absorber (3), a circulating tube (4), a transducer (5), and a heat gathering tube (6), wherein
the solar heat absorber (3) and the transducer (5) are connected by the circulating tube (4) to form a circulation loop, a liquid state circulating working medium flows in the circulation loop,
the solar heat absorber (3) is configured to absorb solar energy, and transfer heat to the transducer (5) through the liquid state circulating working medium, and
the heat gathering tube (6) comprises a heat absorption section (61) and a heat release section (62) in communication, the heat absorption section (61) is inserted into the transducer (5) for absorbing heat from the transducer (5) and transferring heat to the heat release section (62), and the heat release section (62) is inserted into a subgrade (10) for heating the subgrade (10).

2. The unpowered anti-frost anti-heave heat gathering device according to claim 1, wherein the heat gathering tube (6) further comprises heat absorbing cores (64) and phase change working mediums (66), wherein the heat absorbing cores (64) are disposed on an inner wall of the heat gathering tube (6), and the phase change working mediums (66) are filled in the heat gathering tube (6).

3. The unpowered anti-frost anti-heave heat gathering device according to claim 2, wherein a plurality of the circulation loops are formed, the plurality of circulation loops are disposed on the heat absorption section (61) at intervals, the heat gathering tube (6) further comprises partition plates (65) disposed on an inner wall of the heat absorption section (61) at intervals inside the transducer (5), the partition plates (65) are perpendicular to a length direction of the heat gathering tube (6) for limiting at least a part of the liquid state phase change working mediums (66) to flow along the length direction of the heat gathering tube (6), and keeping at least a part of the liquid state phase change working mediums (66) inside the transducer (5).

4. The unpowered anti-frost anti-heave heat gathering device according to claim 1, wherein the heat gathering tube (6) further comprises fins (63) disposed on an outer wall of the heat absorption section (61), and inside the transducer (5).

5. The unpowered anti-frost anti-heave heat gathering device according to claim 1, wherein the unpowered anti-frost anti-heave heat gathering device further comprises a pressure protection unit (7) disposed on the circulating tube (4) for controlling a pressure in the circulating tube (4) within a preset range.

6. The unpowered anti-frost anti-heave heat gathering device according to claim 5, wherein the pressure protection unit (7) comprises a housing (71), a vapor-liquid conversion filter element (72), a positive pressure valve (73), a negative pressure valve (74) and cooling fins (75), wherein an opening at a lower end of the housing (71) is in communication with the circulating tube (4), and an opening at an upper end of the housing (71) is mounted with the positive pressure valve (73) and the negative pressure valve (74), the vapor-liquid conversion filter element (72) is disposed inside the housing (71), and the cooling fins (75) are disposed on an outer wall of the housing (71).

7. An unpowered anti-frost anti-heave heat gathering subgrade, comprising:
a subgrade (10); and
an unpowered anti-frost anti-heave heat gathering device, comprising a solar heat absorber (3), a circulating tube (4), a transducer (5), and a heat gathering tube (6), wherein the solar heat absorber (3) and the transducer (5) are connected by the circulating tube (4) to form a circulation loop, a liquid state circulating working medium flows in the circulation loop, the solar heat absorber (3) is configured to absorb solar energy, and transfer heat to the transducer (5) through the liquid state circulating working medium, and the heat gathering tube (6) comprises a heat absorption section (61) and a heat release section (62) in communication, the heat absorption section (61) is inserted into the transducer (5) for absorbing heat from the transducer (5) and transferring heat to the heat release section (62), and the heat release section (62) is inserted into a subgrade (10) for heating the subgrade (10),
wherein the solar heat absorber (3) is mounted outside the subgrade (10), and the heat release section (62) of the heat gathering tube (6) is inserted inside the subgrade (10).

8. The unpowered anti-frost anti-heave heat gathering subgrade according to claim 7, wherein an angle between a length direction of the heat gathering tube (6) and a horizontal plane is within a range from −30° to 30°.

9. The unpowered anti-frost anti-heave heat gathering subgrade according to claim 7, wherein the unpowered anti-frost anti-heave heat gathering subgrade further comprises a heat preservation material layer (8) disposed on a slope of the subgrade (10).

10. The unpowered anti-frost anti-heave heat gathering subgrade according to claim 7, wherein two opposite sides of the subgrade (10) are both disposed with the unpowered anti-frost anti-heave heat gathering device, and one side of the subgrade (10) is disposed with a plurality of unpowered anti-frost anti-heave heat gathering devices at intervals.

11. The unpowered anti-frost anti-heave heat gathering subgrade according to claim 7, wherein the heat gathering tube (6) further comprises heat absorbing cores (64) and phase change working mediums (66), wherein the heat absorbing cores (64) are disposed on an inner wall of the heat gathering tube (6), and the phase change working mediums (66) are filled in the heat gathering tube (6).

12. The unpowered anti-frost anti-heave heat gathering subgrade according to claim 11, wherein a plurality of the circulation loops are formed, the plurality of circulation loops are disposed on the heat absorption section (61) at intervals, the heat gathering tube (6) further comprises partition plates (65) disposed on an inner wall of the heat absorption section (61) at intervals inside the transducer (5), the partition plates (65) are perpendicular to a length direction of the heat gathering tube (6) for limiting at least a part of the liquid state phase change working mediums (66) to flow along the length direction of the heat gathering tube (6), and keeping at least a part of the liquid state phase change working mediums (66) inside the transducer (5).

13. The unpowered anti-frost anti-heave heat gathering subgrade according to claim 7, wherein the heat gathering tube (6) further comprises fins (63) disposed on an outer wall of the heat absorption section (61), and inside the transducer (5).

14. The unpowered anti-frost anti-heave heat gathering subgrade according to claim 7, wherein the unpowered anti-frost anti-heave heat gathering device further comprises a pressure protection unit (7) disposed on the circulating tube (4) for controlling a pressure in the circulating tube (4) within a preset range.

15. The unpowered anti-frost anti-heave heat gathering subgrade according to claim 7, wherein the pressure protection unit (7) comprises a housing (71), a vapor-liquid conversion filter element (72), a positive pressure valve (73), a negative pressure valve (74) and cooling fins (75), wherein an opening at a lower end of the housing (71) is in communication with the circulating tube (4), and an opening at an upper end of the housing (71) is mounted with the positive pressure valve (73) and the negative pressure valve (74), the vapor-liquid conversion filter element (72) is disposed inside the housing (71), and the cooling fins (75) are disposed on an outer wall of the housing (71).

\* \* \* \* \*